United States Patent
Koch et al.

(10) Patent No.: US 7,079,312 B2
(45) Date of Patent: Jul. 18, 2006

(54) OPTICAL AMPLIFIERS

(75) Inventors: Frank Koch, Paignton (GB); Paul Johnson, Torquay (GB); Toby Reid, Torquay (GB)

(73) Assignee: Bookham Technology plc, Oxfordshire (GB)

( * ) Notice: Subject to any disclaimer, the term of this patent is extended or adjusted under 35 U.S.C. 154(b) by 178 days.

(21) Appl. No.: 10/788,006

(22) Filed: Feb. 25, 2004

(65) Prior Publication Data

US 2004/0190124 A1   Sep. 30, 2004

(30) Foreign Application Priority Data

Feb. 26, 2003 (GB) .................................. 0304341

(51) Int. Cl.
*H04B 10/12* (2006.01)
(52) U.S. Cl. ................................... 359/341.3
(58) Field of Classification Search ............. 359/341.3
See application file for complete search history.

(56) References Cited

U.S. PATENT DOCUMENTS

| | | | |
|---|---|---|---|
| 5,710,660 A * | 1/1998 | Yamamoto et al. ..... | 359/341.44 |
| 6,304,371 B1 | 10/2001 | Sugiya et al. ............ | 359/341.4 |
| 6,307,670 B1 * | 10/2001 | McNamara .............. | 359/341.33 |
| 6,359,727 B1 | 3/2002 | Nakazato ................. | 359/337.4 |
| 6,377,394 B1 * | 4/2002 | Drake et al. ............ | 359/341.41 |
| 6,687,049 B1 | 2/2004 | Sulhoff et al. .......... | 359/341.4 |

FOREIGN PATENT DOCUMENTS

| | | |
|---|---|---|
| EP | 0 845 840 A | 6/1998 |
| EP | 1 115 185 A3 | 9/2002 |
| WO | 01/45215 A1 | 6/2001 |
| WO | 03/026085 A2 | 3/2003 |

OTHER PUBLICATIONS

International Search Report for corresponding Application No. PCT/GB2004/000772; dated Feb. 25, 2004 (re-submitted—copy provided).
UK Search Report for corresponding Application No. 0304341.1 dated Sep. 17, 2003.

* cited by examiner

*Primary Examiner*—Deandra M. Hughes
(74) *Attorney, Agent, or Firm*—Renner, Otto, Boisselle and Sklar, LLP

(57) ABSTRACT

An EDF amplifier comprises two EDF loops separated by optical isolators and pumped with light by pump laser diodes under the control of an output power control system. To achieve the required output power the current supplied to the pump supplying light to the input loop is set to the maximum drive current $I_{max}$ for the pump laser, and the pump currents of all pumps not supplying light to the input loop, that is the pumps supplying light to the further loop or loops, are adjusted to achieve the required output power. To avoid a very high MPI, the inversion of all loops is never so low that the gain in the first loop has to compensate for loss in the following loop or loops. This is done by providing a minimum pump power to the second loop and any following loops. This ensures that the loops are always inverted enough, and that they do not exhibit too much loss. The required minimum pump current is obtained by modelling and experimental verification.

7 Claims, 2 Drawing Sheets

OPTICAL AMPLIFIERS

This invention relates to optical amplifiers and is concerned more particularly, but not exclusively, with multiple stage erbium doped fibre amplifiers (EDFAs).

BACKGROUND OF THE INVENTION

The optical noise performance of optical amplifiers can be characterised by two main performance parameters, namely the noise figure (NF) and the multipath interference (MPI). In a highly inverted erbium doped fibre (EDF) amplifier not only is the signal amplified by stimulated emission, but also spontaneous emission is generated. This spontaneous emission can be further amplified by the amplifier resulting in amplified spontaneous emission (ASE). ASE is generated over the gain wavelength region between and underneath the data channels. At the receiver it is possible to filter out most of the ASE between the channels, but not the noise underneath the data channels. This leads to the definition of the signal spontaneous noise figure $NF_{s-sp}$.

In a generic amplifier with an input stage comprising a tap coupler, an isolator and other optical components the losses in the input stage are added to the other losses in a dB for dB regime. Therefore it is important to minimize the losses in the input stage in order to optimise the noise performance of the amplifier. By dividing the EDF amplifier into imaginary sections with constant gain and close to exponential decay of pump power and inversion along a forward pumped amplifier, it can be demonstrated that the highest gain is in the first section of the amplifier. Similarly to the relationship between the input losses and the NF, high gain in the first section decreases the overall NF. In summary it can be said that, for a low NF amplifier, the input stage losses have to be minimized and the signal has to be amplified as early as possible.

Reflections in the optical signal path within the EDF amplifier are produced at different points. Passive components such as dielectric filters, optical circulators and isolators are made of bulk optic components inserted between collimating and collecting optical elements. Furthermore each of the optical surfaces produces a reflection, even if such reflection has been minimized by use of antireflection coatings. A typical return loss is ~55 dB, although pump laser diodes can have a much higher return loss of the order of ~20 dB and fibre Bragg gratings can have a return loss down to 1 dB. Additionally Rayleigh scattering in optical fibres provides a reflection mechanism in the fibre itself, although compared to discrete reflections the Rayleigh scattering can usually be ignored.

Double reflections of the signal in the amplifier (higher order reflections being ignored) or multipath interference (MPI) act as another source of noise. In an EDF amplifier this noise cannot be measured in the optical domain by contrast with the signal spontaneous noise figure. Furthermore, in the case where there is a highly inverted EDF between two reflection points in the amplifier, the MPI can reach levels that will deteriorate the amplifier performance significantly.

U.S. Pat. No. 6,377,394 discloses a control arrangement for controlling pump currents supplied to a number of pump stages of an EDF amplifier in order to achieve a substantially constant gain in spite of the various factors tending to give rise to gain modulation. However, at low levels of amplification, current is supplied only to the first pump stage, and no current is supplied to the or each further pump stage. As a result losses are associated with the further pump stages which are in turn compensated for by an increase in the power supplied to the first pump stage, thus providing a high level of MPI and deteriorating the performance of the amplifier.

It is an object of the invention to provide an optical amplifier having a low noise characteristic which is maintained over time and under various conditions.

SUMMARY OF THE INVENTION

According to one aspect of the present invention there is provided an optical amplifier comprising an input pump stage and one or more further pump stages, and control means for controlling pump currents supplied to the pump stages to vary the gain whilst imparting low noise performance to the amplifier, wherein, up to a predetermined amplification level, the gain is controlled by varying the pump current to the input pump stage, and the pump current supplied to the or each further pump stage is maintained at a desired low value as the gain is varied up to the predetermined amplification level.

According to another aspect of the present invention there is provided an optical amplifier comprising an input pump stage and one or more further pump stages, and control means for controlling pump currents supplied to the pump stages to vary the gain whilst imparting low noise performance to the amplifier, wherein, above a predetermined amplification level, the pump current supplied to the input pump stage is maintained at a desired maximum value, and the pump current supplied to at least one further pump stage is at a desired low value at the predetermined amplification level and is increased from said low value to control the gain as the gain is increased above the predetermined amplification level.

According to another aspect of the present invention there is provided an optical amplifier comprising an input pump stage and one or more further pump stages, and control means for controlling pump currents supplied to the pump stages to vary the gain whilst imparting low noise performance to the amplifier, wherein the pump current supplied to at least one further pump stage is maintained at a desired low value up to a predetermined amplification level and is increased from said low value to control the gain as the gain is increased above the predetermined amplification level, the pump current supplied to the input pump stage being maintained at a desired maximum value as the gain is increased above the predetermined amplification level.

Such an arrangement provides a compromise between a low NF and a low MPI by using high gains early in the amplifier for low NF and an evenly spread gain in all stages for low MPI. The key feature is the control of the distribution of the gain across all stages of the amplifier so as to optimise the total noise performance comprising the signal spontaneous noise and the multipath interference. This provides good noise performance over a range of required levels of amplification, and allows the same amplifier to be used for a range of applications, for example for use with only one channel or with a plurality of channels, or for use with a range of different span lengths between successive amplifiers.

In a preferred application of the invention to an EDF amplifier comprising two or more EDF loops, one or more pumps are provided for the first loop and one or more pumps are provided for the other loop or loops, and the control arrangement serves to control the distribution of the gain across different EDF loops with the first loop mostly dominating both the NF and the MPI and the other loop or loops providing the required output power. Another parameter in the optimisation of an optical amplifier is the dynamic operating range of the input power. Very low input powers are amplified very quickly along the fibre and require very low pump power. High input power saturates the fibre and the amplification is more evenly spread along the fibre. As already discussed, this might suggest that for low input power the required gain could be achieved solely in the first loop and that the following loops would not require pumping. However there will be a loss associated with any unpumped loop in which case the gain of the first loop would need to be increased to achieve the overall required gain-which would lead to the gain of the first loop being very high resulting in very high MPI.

BRIEF DESCRIPTION OF THE DRAWINGS

In order that the invention may be more fully understood reference will now be made, by way of example, to the following drawings, in which.

DETAILED DESCRIPTION OF THE DRAWINGS

Figure 1:
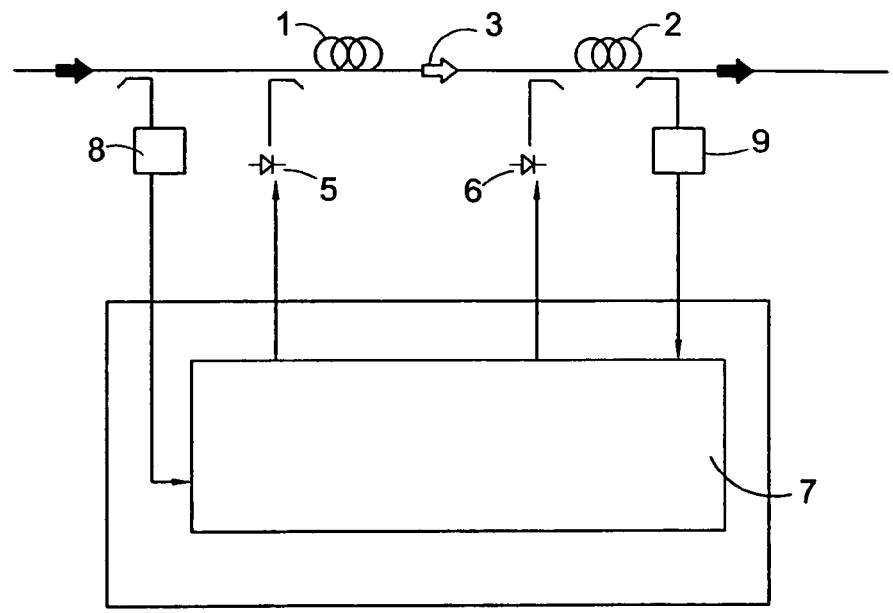
FIG. 1 is a schematic diagram of an EDF amplifier in accordance with the invention.

FIG. 1 shows an EDF amplifier comprising two EDF loops 1 and 2 separated by optical isolators 3 and pumped with light by pump laser diodes 5 and 6 under the control of an output power control system 7. Although the figure shows only a single pump laser diode 5 or 6 for each loop 1 or 2, it should be appreciated that either of the loops 5 and 6 may be pumped by two or more laser diodes, and furthermore one or more additional loops and associated pump laser diodes may be provided. Generally the amplifier uses a pump control scheme as follows. To achieve the required output power the current supplied to the pump (or all pumps) supplying light to the input loop 1 are set to the maximum drive current $I_{max}$ for the pump laser. The pump currents of all pumps not supplying light to the input loop 1, that is the pumps supplying light to the further loop or loops 2, are adjusted to achieve the required output power. Other amplifier control schemes may be utilised, for example as disclosed in U.S. Pat. No. 6,377,394.

The significance of the current value $I_{max}$ supplying the pump for the loop 1 is that a very low noise figure can be produced by amplifying the signal as early as possible in the amplifier. This can be provided by having a high inversion at the beginning of the Er doped fibre, which can be achieved by pumping the Er doped fibre with as much pump power as possible. A reduction in the pump power to the loop 1, causing a reduction in the inversion of the Er doped fibre and the gain in the loop 1, will result in the noise figure of the amplifier being increased.

There is therefore a compromise required to produce a low NF and low MPI involving high gains early in the amplifier for low NF and an evenly spread gain for low MPI. The control arrangement serves to control the distribution of the gain across different EDF loops in the amplifier. The first loop mostly dominates both the NF and the MPI whereas the other loop or loops provides the required output power. Another parameter in the optimisation of an optical amplifier is the dynamic operating range of the input power. Very low input powers are amplified very quickly along the fibre and require very low pump power. High input power saturates the fibre and the amplification is more evenly spread along the fibre. For low input power this can mean that the required gain can be achieved in the first loop and the following loops do not require pumping. However there will be a loss associated with any unpumped loop in which case the gain of the first loop would need to be increased to achieve the overall required gain. This can lead to the gain of the first loop being very high resulting in very high MPI.

The invention prevents this possibility by ensuring that the inversion of all loops is never so low that the gain in the first loop 1 has to compensate for loss in the following loops. This is done by providing a minimum pump power to the second loop 2 and any following loops. This ensures that the loops are always inverted enough, and that they do not exhibit too much loss. The required minimum pump current is obtained by modelling and experimental verification. The minimum pump current is based on the change of the signal spontaneous noise figure and MPI against the power in the second loop 2 and any following loops (i.e, the pumps not contributing to the first loop 1) and the expected aging properties of the pump laser. The pump laser should be well above threshold and pumping the fibre enough to generate a level of inversion to get the fibre around the "transparency" point (corresponding to substantially no loss).

Referring to FIG. 1 the output power control system 7 for controlling the currents supplied to the pump laser diodes 5 and 6 receives a signal indicative of the input power from a photodetector 8 which detects a proportion of the optical input signal tapped off from an input portion of the fibre, as well as a signal indicative of the output power from a photodetector 9 which detects a proportion of the optical output signal tapped off from an output portion of the fibre. This enables the currents to be dynamically controlled to optimise the noise performance in the manner described above.

Figure 2:
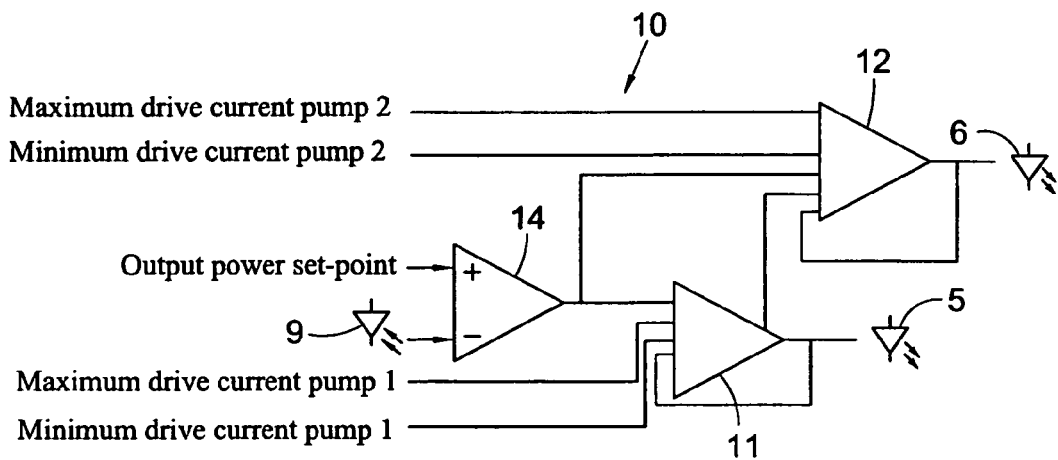
FIG. 2 is block diagram of a control arrangement for such an amplifier.

A possible control arrangement is illustrated diagrammatically in FIG. 2. Although a simple two-loop, two-pump design is shown in FIG. 2, it will be appreciated that a similar scheme in accordance with the invention could be applied to amplifiers having more than two loops and/or more than two pumps. The control arrangement 10 comprises two laser diode controllers 11 and 12 for controlling the drive currents to the pump laser diodes 5 and 6 respectively, and a comparator 14. The input parameters to the control arrangement 10 are the output power set point, the minimum and maximum drive currents for the pump laser diode 5, and the minimum and maximum drive currents for the pump laser diode 6.

The signal from the output power photodetector 9 is compared in the comparator 14 with the output power set point, and the difference signal is supplied to the controllers 11 and 12. As long as the required output power can be reached within the current limits of the controller 11, the controller 12 idles the pump laser diode 6 at the minimum drive current for the diode 6. However, once the controller 11 has reached the maximum current, the controller 12 is activated and adjusts its current in accordance with the difference signal from the comparator 14 so as to control the gain applied within the second loop in accordance with the difference between the detected output power and the output power set point.

Figure 3:
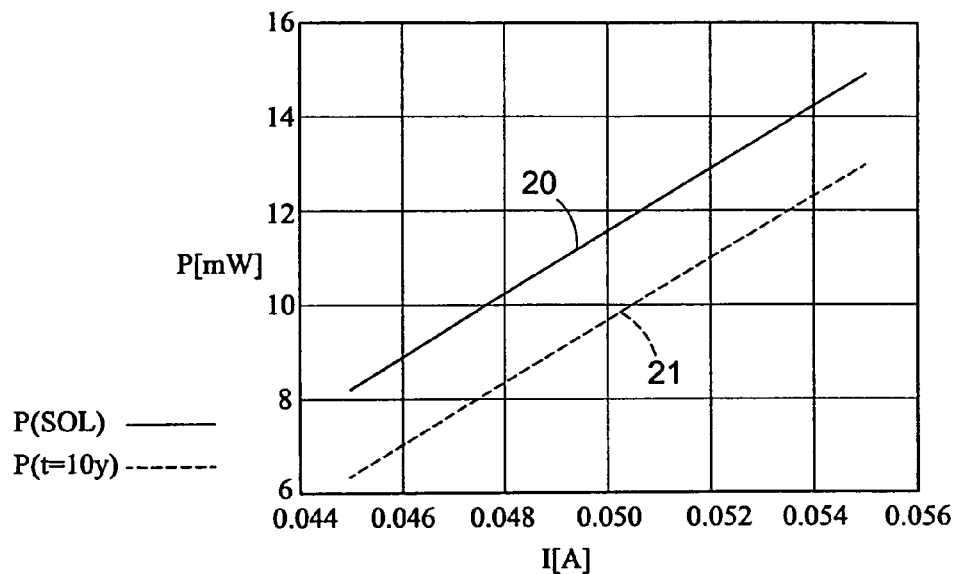
FIG. 3 is a graph of pump power against current showing the decrease of power during aging.

The laser diodes used for the pumps age over their operational life span. In this regard the three major changeable parameters are threshold current, slope efficiency and coupling efficiency. Taking these three parameters into account the "LI-curve" 20 at low output power for the Start of Life (SOL) of one of the laser diodes is shown as a solid line in the graph of FIG. 3 of the optical pump power P against supply current I, whereas "LI-curve" 21 after 10 years (t=10y) is shown as a broken line. It will be appreciated that the output power for a fixed drive current has decrease by about 15% after 10 years. For the proposed amplifier it follows that the optical pump power for pumps not contributing to the loop 1 will vary over time. Neglecting other ageing effects the pump or pumps contributing to the loop 1 have to compensate for this. This implies an improvement in the NF, but the MPI will suffer. Therefore it is important to budget for the change in pump power over the life of the amplifier. As for system performance the NF and MPI will tend to vary in opposite directions during ageing, that is the NF improves with age whilst the MPI deteriorates with age and can counterbalance the varying NF. This is only a qualitative description as the system performance depends on parameters outside the amplifier.

Figure 4:
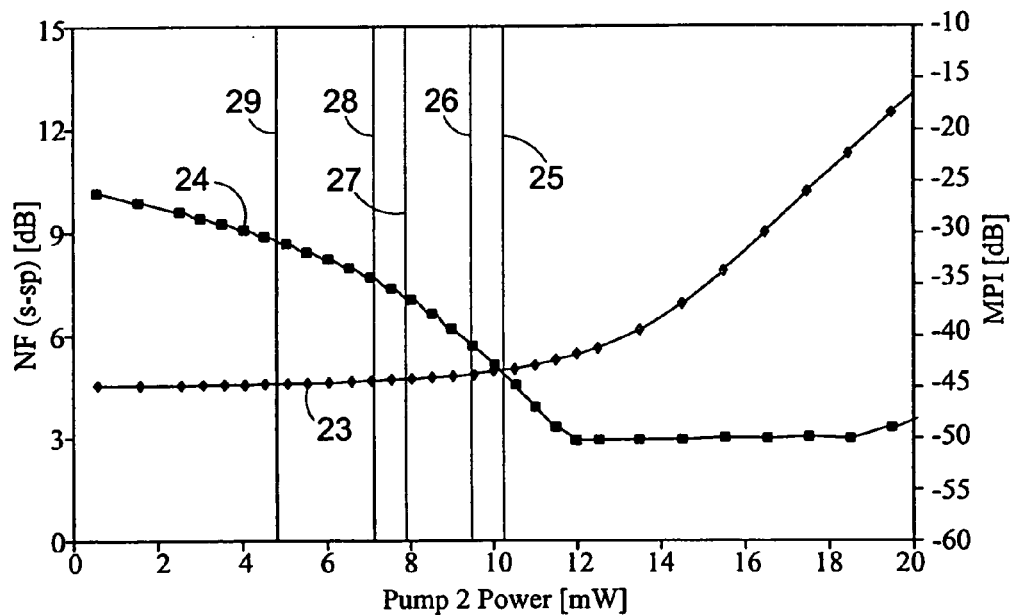
FIG. 4 is a graph showing the NF and MPI against pump power for one of the further pumps.

FIG. 4 shows an example of variation of the NF max and the MPI against the pump power of the pumps not contributing to the loop 1 (here shown as the power P2 of the pump 6). It is assumed that the current for this pump is kept constant, but ageing and variations of component losses are taken into account. Over the lifetime of the device the NF max and MPI move along these lines 23 and 24 respectively where the line 25 denotes the SOL maximum power, the line 26 denotes the SOL nominal power, the line 27 denotes the EOL (End of Life) nominal power (10 years), the line 28 denotes the EOL minimum power (10 years), and the line 29 denotes the EOL nominal power (25 years).

The invention claimed is:

1. An optical amplifier comprising an input pump stage and one or more further pump stages, and control means for controlling pump currents supplied to the pump stages to vary the gain whilst limiting noise due to multipath interference (MPI) and amplified spontaneous emission (ASE), wherein, up to a predetermined amplification level, the gain is controlled by varying the pump current to the input pump stage, whilst ensuring that the pump current applied to the input pump stage is maintained at such a level that a finite, non-zero low value, below the pump current to the input pump stage, must at all times be applied to the or each further pump stage to maintain a required output power as the gain is varied up to the predetermined amplification level, and, above the predetermined amplification level, the pump current supplied to the input pump stage is maintained at a desired maximum value, and the pump current supplied to at least one said further pump stage is increased from said low value to control the gain as the gain is increased above the predetermined amplification level.

2. An optical amplifier according to claim 1, wherein, where there are a plurality of further pump stages, the control means is arranged to apply the desired non-zero low pump current to each of the further pump stages up to at least the predetermined amplification level.

3. An optical amplifier according to claim 1, wherein output power monitoring means are provided for monitoring the output power of the amplifier.

4. An optical amplifier according to claim 3, wherein comparison means are provided for comparing the monitored output power to an output power set point and for supplying a difference signal to the control means to control the pump currents applied to the pump stages.

5. An optical amplifier according to claim 1, wherein input power monitoring means are provided for monitoring the input power of the amplifier.

6. An optical amplifier according to claim 1, wherein the pump stages comprise loops of an erbium-doped fibre.

7. An optical amplifier according to claim 1, wherein the pump stages incorporate pump laser diodes.

* * * * *